Sept. 29, 1936. A. J. FIPPARD 2,055,970
TRANSMISSION
Filed Feb. 18, 1932 3 Sheets-Sheet 1

INVENTOR
A. J. FIPPARD
BY
ATTORNEY

Sept. 29, 1936.   A. J. FIPPARD   2,055,970
TRANSMISSION
Filed Feb. 18, 1932   3 Sheets-Sheet 2

INVENTOR
A. J. FIPPARD
BY
ATTORNEY

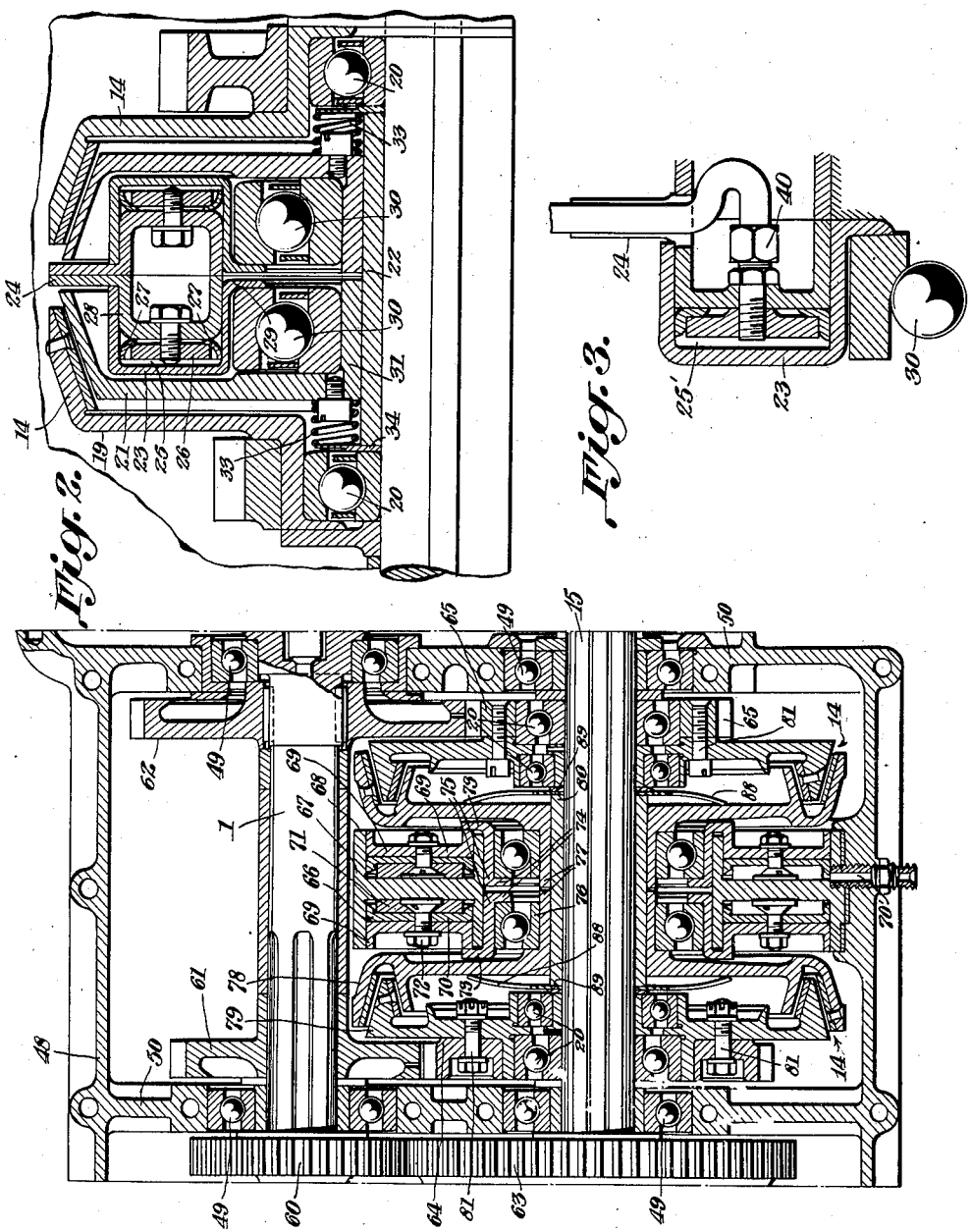

Patented Sept. 29, 1936

2,055,970

UNITED STATES PATENT OFFICE 2,055,970

TRANSMISSION

Arthur John Fippard, Wallington, England

Application February 18, 1932, Serial No. 593,851
In Great Britain April 17, 1931

13 Claims. (Cl. 192—87)

The primary object of the invention is to provide a transmission of constant mesh toothed wheel type with friction, dog or like clutches that are brought into operation by means of distensible devices acting through anti-friction thrust bearings, the distensible devices being selectively operable for bringing into use any one of a number of different gear ratios, or "reverse".

The above and other objects of the invention will be clear from the following description taken in conjunction with the accompanying drawings, and the appended claims.

In the drawings:

Figure 2 is a sectional detail illustrating more particularly the pneumatic or hydraulic devices for operating the clutches shown in Figure 1.

Figure 3 is a sectional detail showing the means for introducing the medium under pressure for operating the clutches.

Figure 4 is a broken view in section, partly in elevation, of a modified form of clutch.

Figure 1:
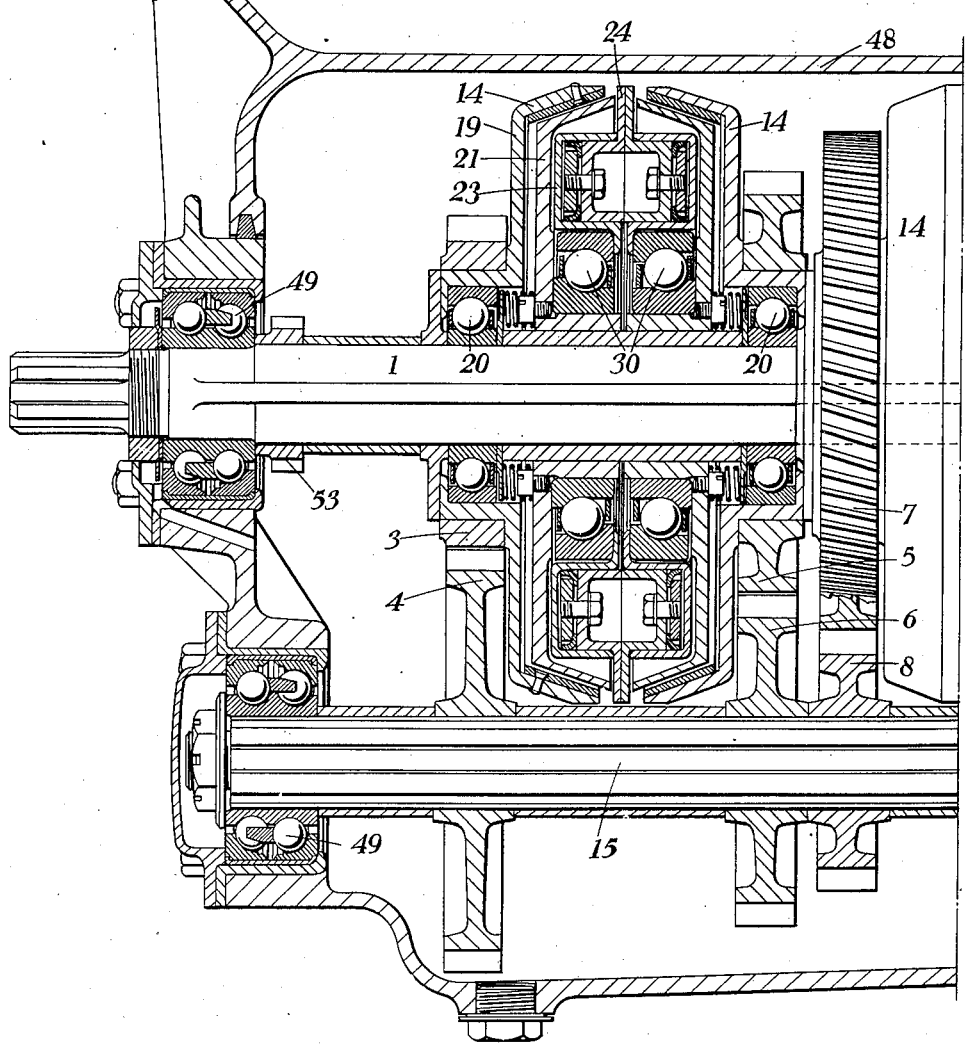
Fig. 1 is a side elevation chiefly in vertical section of a gear and its case, said gear having expansible elements and clutches for variable ratio purposes on its drive shaft.
Figure 1:
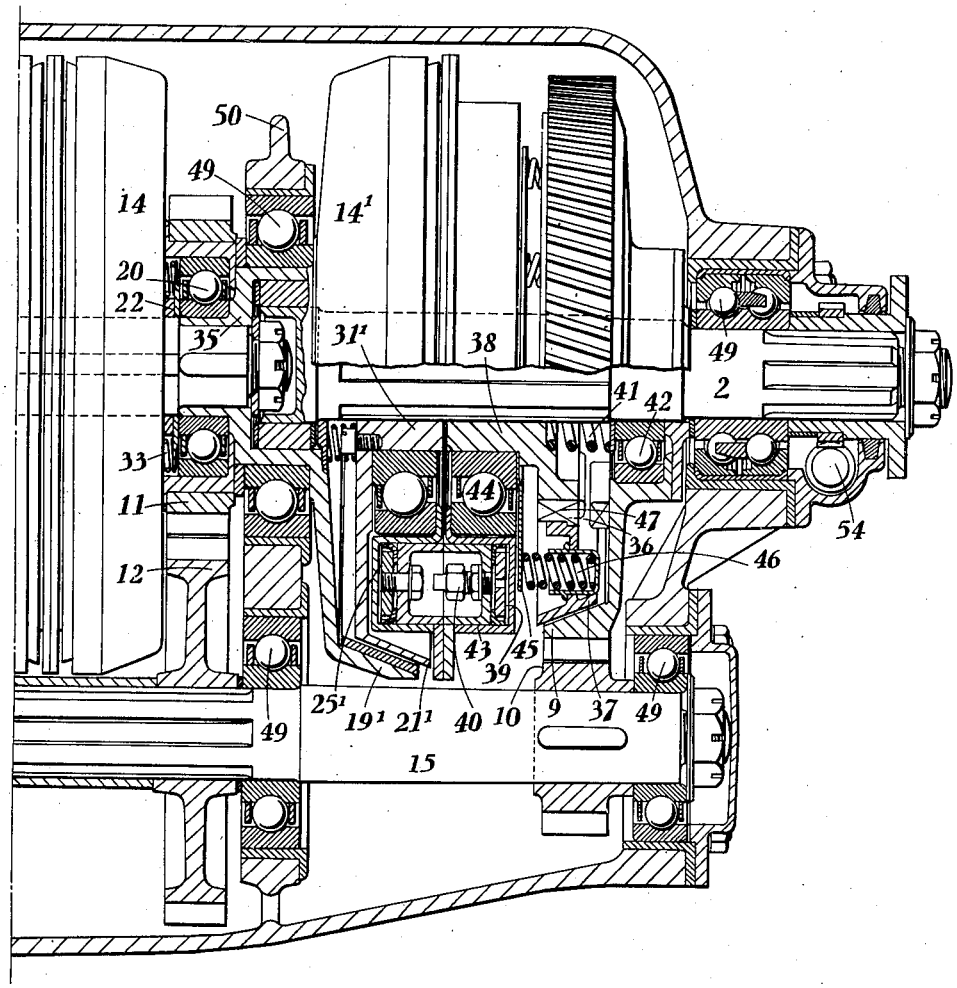

In the example according to Figs. 1 to 3 a drive shaft 1 may be connected with a driven or tail shaft 2 through any pair of constant mesh toothed wheels 3—4, 5—6, 7—8, and a pair of return-drive gears 9—10, the pairs of gears 3—8 giving first, second and third speed respectively, or it may be connected directly with the shaft 2 to give top speed, or may be made to drive the said shaft 2 reversely through a transmission including constant mesh toothed wheels 11 and 12 constantly in mesh with an idler. A selected drive other than direct is brought into effect by pneumatically closing the elements of one of the duplicate friction clutches 14 so as to connect a wheel 3, 5, 7 or 11 to the driving shaft 1, the wheels 3, 5, 7 and 11 being mounted in freely rotatable manner with respect to the shaft 1 whilst their fellows 4, 6, 8, 12 are splined on to a lay shaft 15 carrying return-drive wheel 10. Direct drive is obtained by the actuation of a clutch 14' which connects 1 and 2 together. The clutches are selectively operated by the appropriate actuation of a distributing valve 16 for compressed air from a reservoir 17 supplied by a compressor 18 driven from the shaft 1.

Each clutch 14 comprises an outer element 19 rigid with its allotted toothed wheel and freely rotatable with respect to the shaft on which it is supported on bearing 20, and a conical element 21 which is connected with the shaft 1 through a sleeve 22 in such a manner that it may slide longitudinally but not rotate with respect to the shaft. The sliding movement of a member 21 and therefore the transmission of drive from the shaft 1 to whichever one of the wheels 3, 5, 7 or 11 is selected is brought about when a thrust ring 23 of channel section is forced laterally with respect to an annular thrust plate 24, fixed in any desired manner against rotation, upon pressure fluid being introduced into an annular space 25. The space 25 is formed between the yoke of the annular channel and an annular clamping ring 26 and packing rings 27, 27 secured by the ring 26 upon an annular ring 28 integral with the thrust plate 24 and projecting into the channel of the ring 23. The ring 23 has an internal flange 29 which imparts the thrust of the ring 23 to the clutch cone 21 through a ball thrust-bearing 30 encircling a boss 31 concentrically of and integral with 21. Owing to the provision of the thrust bearing 30 between the thrust ring 23 and the element 21 it is possible to arrange that the thrust ring 23 is non-rotatable, a feature which greatly minimizes wear between 23 and 28, etc. and results in the satisfactory working of the gear. The pressure fluid is introduced into the space 25 through suitable nipples such as 40, Fig. 3, which may be of any suitable construction and which are connected through pipes 32 with the distributing valve. When it is desired to discontinue the drive between the shaft 1 and whichever one of the wheels 3, 5, 7, 11 is selected the distributing valve is operated to open space 25 to exhaust so that compression springs 33 angularly spaced around the sleeve 22 and located between the outer face of element 21 and a plate 34 at the adjacent side of a bearing 20 are able to restore and therefore disengage the elements 19, 21.

For direct drive the conical element 21' of a clutch 14' splined to the shaft 2 is, upon the introduction of pressure fluid into an annular space 25', engaged with the outer element 19' of the clutch and the drive 1 is conveyed directly to 2 because the element 19' has a hub 35 that is fixed on the tail of the shaft 1. The clutch elements are disengaged in substantially the same manner as those of the clutches 14, the arrangement of this clutch 14' differing from 14 chiefly in that a boss 31' is slidable on the shaft 2 and that 19' has the hub 35 fixed on 1.

For the purpose of preventing rotation of all of the gears during direct drive the return drive wheel 9 is disconnected from the shaft 2 by freeing a dog clutch 36 and a friction clutch 37, the opposite elements of the clutches being arranged on a boss 38 and on the wheel 9. This disengagement is automatically effected every time a direct drive is made in that air normally under pressure in a space 39 is exhausted through a nipple 40 to atmosphere by the distributing valve so that a spring 41 between the boss 38 and a bearing 42 for the wheel 9 is allowed to extend and disengage the clutches. The re-engagement of the clutches 36, 37 is effected by introducing air under pressure into space 39 by way of a nipple 40 so that a thrust ring 43, through a thrust bearing 44, operated and operating in substantially the same manner as their counterparts in a clutch 14, and a thrust plate 45 and springs 46, effect the re-engagement of the clutch members 36 and 37. The cone part of the clutch 37 is slidable on keys 47 carried by the boss 38 so that clutch 37 takes up the drive before the elements of 36 engage, therefore the shock that would otherwise occur upon the elements of clutch 36 making positive engagement is greatly lessened or eliminated. The continued inward movement of boss 38 made possible owing to the key connection 47 results in the spring 46 being compressed, and the spring, when the space 39 is allowed to exhaust, ensures that the parts of clutch 36 disengage.

The gear box or case is indicated by reference 48 and has mounted in it ball bearings 49 for the several shafts, bearings that are located between the clutch for wheel 11 and the clutch 14' being mounted in a web 50 extending across the box.

In Fig. 4 clutches 14 and the gear wheels they selectively include in drives having ratios other than direct are mounted upon a lay shaft 15. A drive shaft 1 constantly drives toothed wheels 60, 61 and 62 in constant mesh with wheels 63, 64 and 65. The clutches are operated by means of non-rotating expansible members 66 comprising annular body parts 67 of I-section the annular recesses 68 of which contain laterally movable rings 69. The rings 69 are of channel section and their innermost faces, which are plane faces, have clamped to them packing rings 70, the clamping means consisting of a ring 71 of smaller internal and external diameters than 69 and nuts and bolts 72.

If air be introduced as by nipples 70' leading from a suitable source between the innermost ends of one set of members 70 and 71 in the recess 68 these members and a ring 69 are laterally displaced. Displacement is transmitted through flanges 73, 74 of a thrust ring 75 to a thrust bearing 76 and, this bearing being mounted on a boss 77 of one element 78 of a clutch 14, the said element is brought into engagement with its fellow 79. Each boss 77 is slidable but not rotatable on a sleeve 80 splined to the lay shaft 15, and the element 79 is secured by bolts 81 to a toothed wheel 63, 64 or 65. Hence engagement of clutch elements 78, 79 cause a drive to be transmitted from one of the wheels 60, 61 or 62 on the drive shaft to one of the wheels 63, 64 or 65, and this drive is conveyed to a driven shaft 2 through suitable gearing not necessary to illustrate.

When air pressure on the operating members (such as 70, 71) of a clutch is released, i. e. exhausted to atmosphere, a clutch element 78, returns to its inoperative position under the action of blade springs such as 88 radiating from a hub such as 89 supported by shaft 15 or 2.

The various shafts, etc., are appropriately supported by means of bearings 49 carried by the case 48 and by partitions 50 extending across the case.

What I claim is:—

1. A dual clutch for selectively coupling driving and driven members for different speed ratios, including a fixed center element in the form of an annular housing of rectangular form in cross section, a non-rotating thrust ring on each side of and guided on said element, said thrust ring being of channel form in cross section, a movable clutch element having sliding non-rotative relation with the driving member arranged immediately beyond each thrust ring, a rotary clutch plate arranged beyond each movable clutch element and carrying relatively fixed driving means, the movable and rotary clutch parts on each side of the fixed element having clutch faces for cooperation under predetermined movement of the movable clutch element, and means for introducing a fluid under pressure between the thrust ring and fixed element to cause the thrust ring to move the selected movable clutch element into clutching cooperation with the cooperating rotary clutch plate.

2. A construction as defined in claim 1, wherein the annular channel of the thrust ring slidably engages the housing of the fixed element to provide between the wall of such housing and the corresponding wall of the thrust ring a space for the reception of fluid under pressure.

3. A construction as defined in claim 1, including means carried by the fixed member to seal the space for the reception of fluid under pressure against leakage.

4. A clutch for coupling driving and driven members, including a fixed element of annular form, a non-rotating thrust ring guided on said element, said fixed element and said non-rotating ring defining an annular fluid space bounded by said fixed element and said ring, a movable clutch element having sliding non-rotative relation with one of said members arranged immediately beyond said thrust ring, a rotary clutch plate arranged beyond said movable clutch element and carrying relatively fixed driving means, the said movable and rotary clutch parts having clutch faces for cooperation under predetermined movement of the movable clutch element, and means for introducing a fluid under pressure into said space to cause said thrust ring to move said movable clutch element into clutching cooperation with said rotary clutch plate.

5. A clutch for coupling driving and driven members, including a fixed element of annular form, a non-rotating thrust ring formed with an annular channel slidably to engage said fixed element and to provide between the wall of such element and the corresponding wall of the thrust ring a space for the reception of fluid under pressure, a movable clutch element having sliding non-rotative relation with one of said members arranged immediately beyond said thrust ring, a rotary clutch plate arranged beyond said movable clutch element and carrying relatively fixed driving means, the said movable and rotary clutch parts having clutch faces for cooperation under predetermined movement of the movable clutch element, and means for introducing a fluid under pressure into said space to cause said thrust ring to move said movable clutch element into clutching cooperation with said rotary clutch plate.

6. A clutch for coupling driving and driven members, including a fixed element of annular form formed with an annular channel, a non-rotating thrust ring, said thrust ring being slidably received in said channel to provide between the walls of said channel and the corresponding wall of said ring a space for the reception of fluid under pressure, a movable clutch element having sliding non-rotative relation with one of said members arranged immediately beyond said thrust ring, a rotary clutch plate arranged beyond said movable clutch element and carrying relatively fixed driving means, the said movable and rotary clutch parts having clutch faces for cooperation under predetermined movement of the movable clutch element, and means for introducing a fluid under pressure into said space to cause said thrust ring to move said movable clutch element into clutching cooperation with said rotary clutch plate.

7. A clutch for coupling driving and driven members, including a fixed element of annular form, a non-rotating thrust ring formed with an annular channel slidably to engage said fixed element and to provide between the wall of such element and the corresponding wall of the thrust ring a space for the reception of fluid under pressure, together with means acting between said fixed element and said thrust ring to seal such space against leakage, a movable clutch element having sliding non-rotative relation with one of said members arranged immediately beyond said thrust ring, a rotary clutch plate arranged beyond said movable clutch element and carrying relatively fixed driving means, the said movable and rotary clutch parts having clutch faces for cooperation under predetermined movement of the movable clutch element, and means for introducing a fluid under pressure into said space to cause said thrust ring to move said movable clutch element into clutching cooperation with said rotary clutch plate.

8. A clutch for coupling driving and driven members, including a fixed element of annular form formed with an annular channel, a non-rotating thrust ring, said thrust ring being slidably received in said channel to provide between the walls of said channel and the corresponding wall of said ring a space for the reception of fluid under pressure, together with means acting between said annular thrust ring and said fixed element to seal such space against leakage, a movable clutch element having sliding non-rotative relation with one of said members arranged immediately beyond said thrust ring, a rotary clutch plate arranged beyond said movable clutch element and carrying relatively fixed driving means, the said movable and rotary clutch parts having clutch faces for cooperation under predetermined movement of the movable clutch element, and means for introducing a fluid under pressure into said space to cause said thrust ring to move said movable clutch element into clutching cooperation with said rotary clutch plate.

9. A dual clutch for selectively coupling driving and driven members for different speed ratios, including a fixed center element of annular form, a non-rotating thrust ring on each side of and guided on said element, said fixed element and said non-rotating rings defining annular fluid spaces bounded by said fixed element and said rings, a movable clutch element having sliding non-rotative relation with one of said members arranged immediately beyond each thrust ring, a rotary clutch plate arranged beyond each movable clutch element and carrying relatively fixed driving means, the said movable and rotary clutch parts on each side of the fixed element having clutch faces for cooperation under predetermined movement of the movable clutch element, and means for selectively introducing a fluid under pressure into said spaces to cause said thrust ring to move the selected movable clutch element into clutching cooperation with the cooperating rotary clutch plate.

10. A dual clutch for selectively coupling driving and driven members for different speed ratios, including a fixed center element of annular form, a non-rotating thrust ring on each side of said fixed element, said non-rotating thrust ring being formed with an annular channel slidably to engage said fixed element and to provide between the wall of such element and the corresponding wall of the thrust ring a space for the reception of fluid under pressure, a movable clutch element having sliding non-rotative relation with one of said members arranged immediately beyond each thrust ring, a rotary clutch plate arranged beyond each movable clutch element and carrying relatively fixed driving means, the said movable and rotary clutch parts on each side of the fixed element having clutch faces for cooperation under predetermined movement of the movable clutch element, and means for selectively introducing a fluid under pressure into said spaces to cause said thrust ring to move the selected movable clutch element into clutching cooperation with the cooperating rotary clutch plate.

11. A dual clutch for selectively coupling driving and driven members for different speed ratios, including a fixed center element of annular form formed with annular channels, a non-rotating thrust ring on each side of said fixed element, said thrust ring being slidably received in a cooperating channel to provide between the walls of said channel and the corresponding wall of said ring a space for the reception of fluid under pressure, a movable clutch element having sliding non-rotative relation with one of said members arranged immediately beyond each thrust ring, a rotary clutch plate arranged beyond each movable clutch element and carrying relatively fixed driving means, the said movable and rotary clutch parts on each side of the fixed element having clutch faces for cooperation under predetermined movement of the movable clutch element, and means for selectively introducing a fluid under pressure into said space to cause said thrust ring to move the selected movable clutch element into clutching cooperation with the cooperating rotary clutch plate.

12. A dual clutch for selectively coupling driving and driven members for different speed ratios, including a fixed center element of annular form, a non-rotating thrust ring on each side of said fixed element, said non-rotating thrust ring being formed with an annular channel slidably to engage said fixed element and to provide between the wall of such element and the corresponding wall of the thrust ring a space for the reception of fluid under pressure, together with means acting between said fixed element and said thrust rings to seal such spaces against leakage, a movable clutch element having sliding non-rotative relation with one of said members arranged immediately beyond each thrust ring, a rotary clutch plate arranged beyond each movable clutch element and carrying relatively fixed driving means, the said movable and rotary clutch parts on each side of the fixed element having clutch faces for cooperation under predetermined movement of the movable clutch element, and means for selectively introducing a fluid under pressure into said spaces to cause said thrust ring to move the selected movable clutch element into clutching cooperation with the cooperating rotary clutch plate.

13. A dual clutch for selectively coupling driving and driven members for different speed ratios, including a fixed center element of annular form formed with annular channels, a non-rotating thrust ring on each side of said fixed element, said thrust ring being slidably received in a cooperating channel to provide between the walls of said channel and the corresponding wall of said ring a space for the reception of fluid under pressure, together with means acting between said annular thrust rings and said fixed member to seal such spaces against leakage, a movable clutch element having sliding non-rotative relation with one of said members arranged immediately beyond each thrust ring, a rotary clutch plate arranged beyond each movable clutch element and carrying relatively fixed driving means, the said movable and rotary clutch parts on each side of the fixed element having clutch faces for cooperation under predetermined movement of the movable clutch element, and means for selectively introducing a fluid under pressure into said spaces to cause said thrust ring to move the selected movable clutch element into clutching cooperation with the cooperating rotary clutch plate.

ARTHUR JOHN FIPPARD.